Dec. 14, 1971     R. H. NUNN ET AL     3,626,697
METHOD AND MEANS FOR CONTROLLING THE THRUST IN
A SOLID PROPELLANT ROCKET MOTOR
Filed Jan. 22, 1965
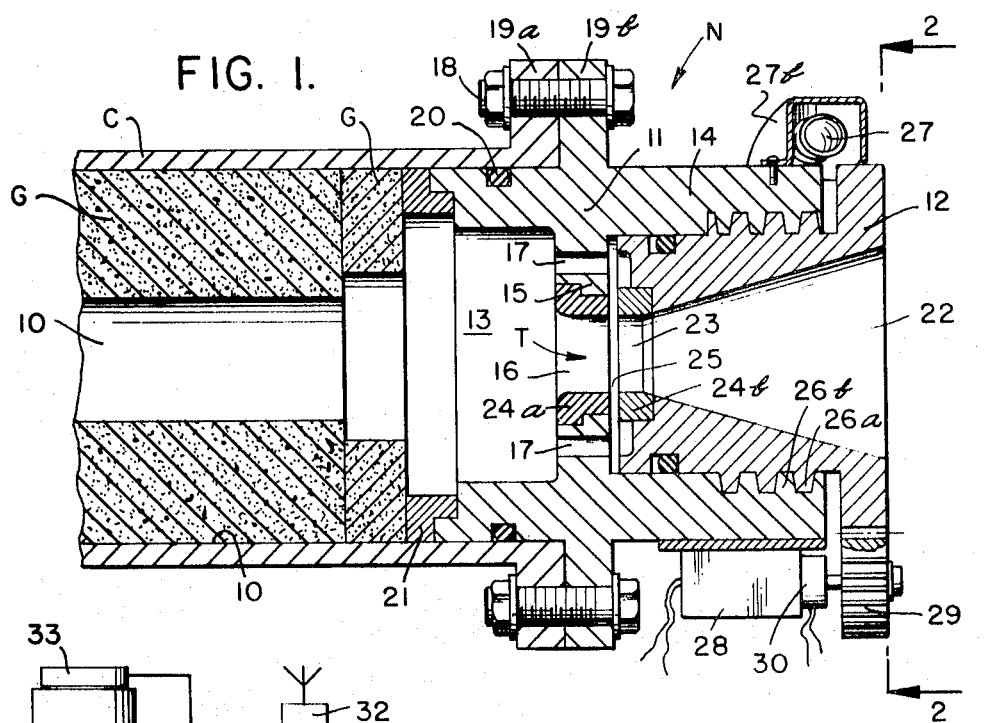
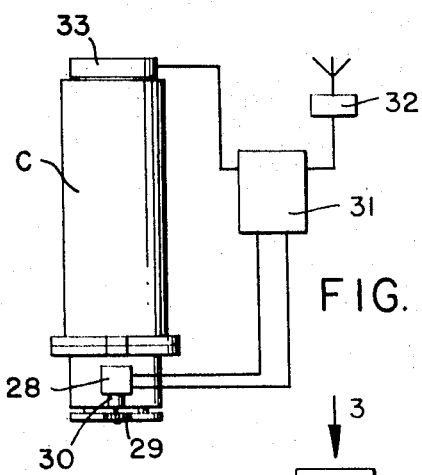
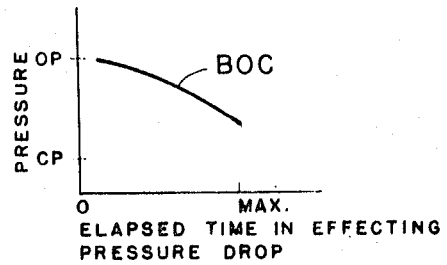
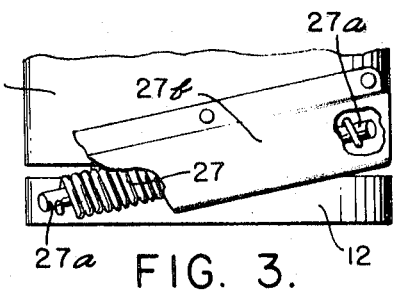
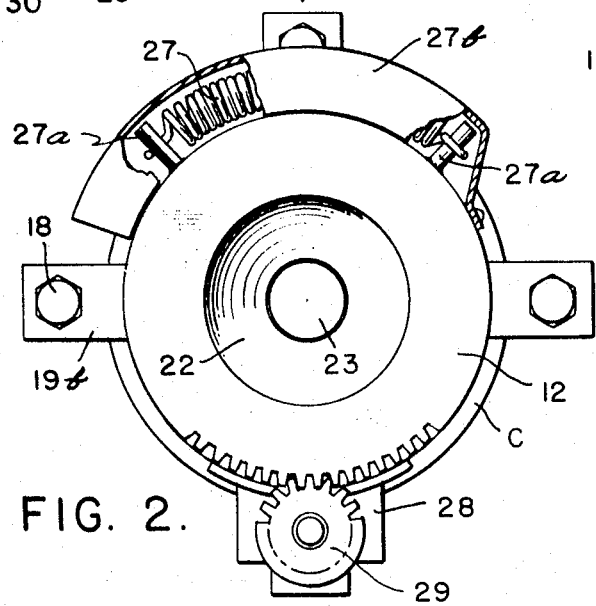
INVENTORS.
ROBERT H. NUNN
LANE CURTIS CHAFFIN
BY
P. H. Firsht
ATTORNEY.

United States Patent Office 3,626,697
Patented Dec. 14, 1971

3,626,697
METHOD AND MEANS FOR CONTROLLING THE THRUST IN A SOLID PROPELLANT ROCKET MOTOR
Robert H. Nunn, Davis, and Lane Curtis Chafin, China Lake, Calif. assignors to the United States of America as represented by the Secretary of the Navy
Filed Jan. 22, 1965, Ser. No. 428,021
Int. Cl. B63h 11/00
U.S. Cl. 60—204     3 Claims The invention described herein may be manufactured and used by or for the Government of the United States of America for governmental purposes without the payment of any royalties thereon or therefor.

The present invention relates generally to improvements in rocket motor control techniques and more particularly to an improved method and means for selectively controlling propellant burning and, consequently, the thrust of solid propellant rocket motors through the utilization of pressurized fluid injected into the throat of rocket motor nozzles.

A solid propellant rocket motor normally includes a combustion chamber, wherein a propellant grain is burned, and a nozzle having a convergent and a divergent nozzle section communicating through a throat which affords a passage of exhaust gases, or the by-products of combustion, from the chamber. The effective throat area serves to dictate chamber pressure which, in turn, serves to dictate the burning rate of a propellant and the resulting thrust level for a given motor. For example, if the effective throat area of the nozzle is increased, the combustion chamber pressure will decrease and thereby cause the burning rate of the propellant to decrease. This decrease will then initiate a drop in the existing thrust level. On the other hand, if the effective throat area is decreased, a rise in chamber pressure, propellant burning rate, and the resulting thrust level will be experienced. Hence, it has been found possible to alter the thrust of an operative rocket motor by varying the effective throat area of the motor's exhaust nozzle. Some of the techniques utilized for this purpose are more fully set forth in copending application Ser. No. 385,104, filed July 23, 1964, which discloses a by-pass gas system for controlling the thrust level in a solid propellant rocket motor.

The system of the aforementioned application is deemed to satisfy many requirements, particularly where the output or the level of thrust for the motor is to be varied while the propellant is being burned in a continuous manner. However, those concerned with the development of rocket motors, of the type which utilize solid propellants, have long recognized a need for techniques which accommodate a selective termination of the burning of a solid propellant, as well as thrust variation, in a manner such that the propellant may be selectively reignited and the motor reactivated prior to the termination of the rocket motor's mission or flight. While applications of such techniques are too extensive to enumerate, some of the more obvious are: to control the periods of active thrust so that the motor may be caused to accurately follow a preselected trajectory; and to effect such impulsive thrust maneuvers as, for example, trajectory adjustment and orbit-transfer.

Known systems fail to fulfill this need, since solid propellant grains are notoriously difficult to extinguish. Previously, when a propellant grain was to be selectively extinguished it was common practice to utilize destructive techniques such as head-end blowout or nozzle ejection, for example. These techniques normally resulted in extensive motor damage which rendered the motor useless for further propelling functions, since the damaged motor could not be reactivated while in flight.

It is the general purpose of the instant invention to provide a method for controlling the burning of a solid propellant grain within a rocket motor, and means for carrying out the method, which overcomes the aforementioned disadvantages while retaining the desired advantages normally present in solid propellant rocket motor systems.

An object of the present invention is to provide a non-destructive method for terminating the burning of a solid propellant grain.

A further object is to provide a method of controlling the burning of a propellant within an in-flight, solid propellant rocket motor.

Another object is to provide a simple method for controlling the thrust of a solid propellant rocket motor to enhance the variable thrust characteristic thereof.

Still another object is to provide simple and economic nozzle systems for solid propellant rocket motors which accommodate in-flight, non-destructive burnout of solid propellant grains disposed within the combustion chambers of rocket motors, whereby the grains may be reignited while the motors are in continuous flight.

Other objects, advantages and novel features of the invention will become apparent from the following detailed description of the invention when considered in conjunction with the accompanying drawings wherein:

FIG. 1 comprises a partial cross section view of the nozzle section for a solid propellant rocket motor, illustrating the means employed to achieve thrust variation for the motor and a termination of propellant burning for the propellant grain;

FIG. 2 comprises an end view of the nozzle section, taken generally along lines 2—2 in FIG. 1;

FIG. 3 comprises a partial top plan view of the motor of FIG. 1, taken generally at 3 in FIG. 2;

FIG. 4 comprises a pressure-time graph including a typical curve, of a family of curves, illustrating the points at which burnout can be expected for a given solid propellant grain; and FIG. 5 is a diagrammatic view, in block form, illustrating a system through which propellant burnout and reignition may be achieved.

Turning now to the drawings, wherein like reference characters designate like or corresponding parts throughout the several views, there is shown in FIG. 1 a partial cross section of a solid propellant rocket motor including a motor casing C, a solid propellant grain G mounted within the motor's combustion chamber 10, and a nozzle insert section, generally designated N. The nozzle insert section N includes an insert block 11 and a threaded nozzle insert 12 disposed therein.

The insert block 11 is of a generally tubular configuration and includes an internal forward portion, which defines a convergent nozzle segment 13, and an aft portion, which defines a nozzle insert housing segment 14. The nozzle segments 13 and 14 are separated by a throat plate 15 having a central opening 16, which serves as a conduit for the exhaust gases, or the gases generated as the propellant grain G is burned in the combustion chamber 10.

A plurality of perforations or by-pass ports 17 extend axially through the plate 15 and are annularly disposed about the opening 16 in a manner such that exhaust gases may be caused to pass axially through the plate 15 and by-pass the opening 16 as the grain G is burned and the gases of combustion are expelled from the chamber 10. The nozzle section N is fitted into the aft end of the casing C and is secured in place by any suitable means, such as, for example, threaded stud bolts 18 passing through oppositely disposed and mutually abutting flange elements or ears 19a and 19b formed on the casing C and nozzle section N, respectively. Where desired, an O-ring seal 20 and a locking ring 21, of a suitable heat resistant material, may be utilized in sealing the nozzle section N within the casing C for thus completing the seal of the combustion chamber 10.

The nozzle insert 12 is of a generally tubular configuration and includes a divergent nozzle segment 22. The nozzle segment 22 is operatively arranged in coaxial alignment with the convergent segment 13 and includes an opening or port 23 disposed in coaxial alignment with the opening 16. Hence, the aligned openings 16 and 23 serve to establish a throat T through which a stream of exhaust gases, generated by the burning of the grain G, may pass to atmosphere beyond the motor. Where found desirable, inserts 24a and 24b, formed of a suitable heat resistant material may be provided in the openings 16 and 23, respectively, and utilized for shielding the surfaces of the openings from the effects of the heated exhaust gases.

It should be particularly noted that the diameter of the openings 16 and 23 should be such that for a given system the exhaust gases will pass therethrough in quantities which will obviate a maintenance of chamber pressures sufficient to sustain a spontaneous burning of the grain G. Consequently, in the absence of an operatively restricted effective throat area, it is intended that the pressure of the chamber 10 be maintained below the critical pressure for the grain, i.e., a pressure below which the given propellant will burn unassisted. However, it is also to be noted that the propellant may attain an abrupt burnout, or a termination of burning, prior to a dropping of the chamber pressure to critical pressure. This is achieved by the controlling rate at which the chamber pressure is dropped from an operating pressure toward a critical pressure and affords a burnout wherein a "sputter" period, or an erratic termination of the burning of the grain G may be effectively obviated.

In order to establish the proper effective throat area, the nozzle insert 12 is displaced slightly from the throat plate 15 so that a secondary injection slot 25 is formed about the throat T. The slot 25 is of a circular configuration and functions to constrict the effective throat area in much the same manner as that disclosed in the aforementioned copending application. That is, the slot 25 serves to direct by-pass gases, or the gases of combustion which pass through the ports 17, transversely into the stream of exhaust gases passing through the throat T for, in effect, constricting the diameter of the stream. The greater the displacement of the insert 12, with respect to the plate 15, the greater will be the quantity of by-pass gas injected into the throat T. Therefore, in an operating rocket motor the effective throat area may be reduced merely by displacing the insert 12 in a direction for increasing the axial or longitudinal dimension of the slot 25. A reduced effective throat area initiates an increase in the chamber pressure which is accompanied by an increased burning rate for the grain G for thus causing the thrust level for the operating motor to rise.

In a like manner, if the longitudinal dimension of the slot 25 is reduced, by displacing the insert 12 toward plate 15, the quantity of by-pass gas injected transversely into the throat T will be reduced, whereby the effective throat area is caused to increase. As the effective throat area is increased, a drop in chamber pressure in experienced. As the chamber pressure is dropped toward critical pressure, the burning rate is reduced with an attendant drop in the thrust level. If the drop in pressure is gradual, the chamber pressure must approach critical pressure in order for the burning to terminate, however, if the drop in pressure is abrupt or substantially instantaneous, propellant burning will terminate abruptly at a pressure substantially above the critical pressure for the grain.

As illustrated by the graph of FIG. 4, motor operating pressure OP is substantially above critical pressure CP. Burnout or burning termination may vary, depending upon the particular propellant being utilized, however, it may be expected to occur at points falling along a given burnout curve, illustrated as curve BOC, as the elapsed time is increased in attaining a pressure drop. The particular slope of the curve BOC will necessarily vary with variations in the propellant composition, therefore, the curve BOC merely serves to represent a possible family of burnout curves. The curve BOC indicates the fact that the chamber pressure existing within the chamber 10 need not be reduced to critical pressure in order to achieve propellant burnout. The effectiveness of the process depends upon the rate $(dp/dt)$ at which the pressure is dropped, as well as the particular pressure attained. Hence, an abrupt drop in chamber pressure will result in an abrupt termination of the burning of the grain, even though the pressure of the chamber 10 remains substantially above the critical pressure CP for the particular propellant grain utilized.

In order to rapidly drop the chamber pressure, for the chamber 10, it has been found necessary to provide a quick-response means for displacing the nozzle insert 12. Means, such as those disclosed in the aforementioned application, fail to respond at a rate sufficient for achieving a satisfactory termination of the burning of the grain G.

As a practical matter, the displacement of the insert 12, as required to initiate burnout, is a relative short distance, particularly where the rate of displacement is increased. Therefore, the external surface of the insert 12 and the internal surface of the insert block or housing 11 are provided with mating screw threads 26a and 26b, respectively, having a lead such that the insert 12 may be rapidly displaced relative to the plate 15 by imposing a torque sufficient for rapidly rotating the insert 12 through approximately forty-five degrees of rotation.

In order to impose sufficient torque, a tension spring 27 is connected between the block 11 and the peripheral surface of the insert 12 by any suitable means, such as a stud 27a, for example. Where desired, a suitable housing 27b may be utilized for shielding the spring 27.

An electrically driven, low-speed, high-torque motor 28 may be utilized for rotating the nozzle insert against the rotational forces applied through the spring 27. A pinion gear coupling 29 also may be employed in coupling the motor 28 to the insert 12 for effecting the desired counter-rotation of the nozzle insert 12. If desired, reduction gears may be employed for developing the torque required for deforming the spring 27. In any exent, to accommodate the desired spring imparted rotation of the insert 12, a solenoid operated clutch 30, of conventional design, and which may also include a brake mechanism, is provided in a manner such that the motor 28 must drive the coupling 29 therethrough. The clutch 30 serves as a means for disconnecting the motor 28 from the coupling 29 for a preselected period of time so that the spring 27 may function for rotating the insert 12 through a preselected angle of rotational displacement. Hence, by dictating the duration of clutch disengagement, the magnitude of imparted nozzle insert displacement may be accurately controlled.

Where the rocket motor is to be operated from a remote control station, a command circuit 31 may be coupled between a system electrical power source, not shown, and the motor and clutch mechanisms for controlling the activation thereof. The circuit 31 is of any suitable design and serves to respond to transmitted signals received through suitable means including a conventional receiver circuit 32.

Therefore, it will be appreciated that preselected axial displacement may be imparted to the insert 12 for controlling the thrust or output of the rocket motor as well as for terminating the burning of the grain G, by selectively controlling the function of the command circuit for dictating the duration of clutch disengagement. Further, the circuit 31 may control the motor 28 and cause it to be activated for rotating and axially displacing the nozzle insert 12 away from the plate 15, thereby increasing the longitudinal dimension of the injection slot 25. Hence, the thrust of the rocket motor may be varied and subsequently terminated merely by initiating a rotation of the nozzle insert 12, in a preselected direction, for thus causing the insert 12 to undergo selected axial displacement relative to the plate 15.

A secondary ignition system 33, which is of any suitable design, may also be controlled by the command circuit 31 so that the grain G may be re-ignited while in flight. Various secondary ignition systems, including solid and liquid igniters, are available and may be utilized for re-igniting the grain G once it has been extinguished, but not consumed. However, the system employed must be compatible with the particular grain G so that a satisfactory secondary ignition of the grain may be achieved. The selection of compatible igniters and grains is deemed to be well within the skill of the art, therefore, a detailed igniter description is omitted in the interest of brevity.

In controlling the operation of the rocket motor, through controlling the burning of the propellant grain G, the nozzle insert 12 is selectively displaced in a direction way from the plate 15, by activating the electrically driven motor 28. The grain G disposed within the combustion chamber 10 is then ignited by an igniter system, which may be included in the secondary ignition system 33. As the propellent grain G is caused to burn, gases of combustion are generated and expelled from the combustion chamber 10 through the throat T and the ports 17. The stream of exhaust gases passing through the throat T is then constricted through the effects of the gases passing through the ports 17. As the stream is constricted, or as the effective throat area is reduced, the pressure within the chamber 10 rises to a given predetermined value causing the propellant burning rate to rise for thus establishing a given thrust level. While the motor is in flight, it may become desirable to reduce the thrust level. This is achieved by reducing the quantity of by-pass gases injected into the stream for thus causing the effective throat area of throat T to be increased. In order to reduce the quantity of by-pass gas injected into the throat T, the brake and clutch mechanisms 30 are disengaged for a predetermined time period for thus allowing the spring 27 to actuate or rotate the nozzle insert 12, whereby it is advanced toward the plate 15 for reducing the longitudinal dimensions of the secondary injection slot 25. The nozzle insert 12 may be retracted by activating the motor 28 for causing the insert 12 to rotate through a predetermined angle of rotation against the forces applied through the spring. In the event that it becomes desirable to terminate the burning of the propellent G, the flow of by-pass gas is interrupted. This is achieved through the mechanism 30, which is operatively disengaged for a time period sufficient for allowing the spring 27 to impart a rapid rotation to the nozzle insert 12 for causing the longitudinal dimension of the slot 25 to be substantially depleted, whereupon injection of by-pass gas ceases and the effective throat area is thereby caused to increase to a maximum value. This effects a very rapid pressure drop within the combustion chamber 10 and initiates a termination of the burning of the propellant grain G, achieved without incurring damage to the motor.

When the grain G is to be re-ignited, the motor 28 is activated, in response to an activation of the command circuit 31, and the nozzle insert 12 is thereby displaced or retracted away from the plate 15. The secondary ignition system may then be activated to this re-establish a burning of the grain G. It is to be understood that this cycle may be repeated several times during a single mission or flight of a given motor.

In view of the foregoing it is to be understood that the present invention provides an effective, simple, and an economic method and device which provides for thrust control, burnout, and re-ignition in solid propellant rocket motors, whereby the utilization of such motors may be greatly enhanced.

Obviously many modifications and variations of the present invention are possible in the light of the above teachings. It is therefore to be understood that within the scope of the appended claims the invention may be practiced otherwise than as specifically described.

What is claimed is:

1. In a system for controlling the effective chamber pressures within a combustion chamber of a variable-thrust rocket motor of the type including an exhaust nozzle through which a stream of exhaust gases is expelled, a combustion chamber for burning propellants therein for generating the exhaust gases, a by-pass conduit for directing exhaust gases transversely into the stream of exhaust gases to thus effectively restrict the stream and thereby establish and control chamber pressures within said combustion chamber, and a pair of co-axially aligned nozzle sections arranged within the nozzle, at least one of said sections being adapted for axial displacement with respect to the other section for dictating the flow of transversely directed exhaust gases, the improvement comprising:

(a) means defining an internally threaded nozzle block surrounding said one section;
   (b) means defining an externally threaded surface for said one section being so disposed as to be mated in threaded engagement with the threads of said nozzle block, whereby said one section may be counter-rotated for axial displacement relative to the other co-axially aligned nozzle section;
   (c) resilient means connected between said block and said one section for continuously applying a rotating force to said one section for displacing said one section in a first direction for reducing the flow of exhaust gases as the gases are directed transversely into the exhaust stream; and
   (d) selectively operable drive and brake means connected with said one section adapted to be activated for rotating said one section in opposition to said spring for thereby displacing said one section in an opposite second axial direction and for selectively retaining said one section against spring induced rotation.

2. A method of controlling the magnitude of thrust, and terminating thrust, in a rocket motor of the type having a combustion chamber, a solid propellant therein, and a thrust nozzle having convergent-divergent portions through which combustion chamber gases exhaust, said portions being axially spaced to provide an effective throat portion therebetween said propellant being of the type which burns only above a critical combustion chamber pressure and also burns at an increasing rate, producing increasing thrust, as combustion chamber pressure increases above critical pressure, comprising the steps of:

(a) by-passing a variable portion of the combustion chamber gases in an inwardly moving envelope into said effective throat at a rate of flow sufficient to maintain combustion chamber pressure above the critical pressure, and varying said rate of flow in an amount to vary chamber pressure between critical pressure and maximum permissible chamber pressure, and
   (b) reducing the rate of flow of the by-passed gases to effect a rate of change in pressure in the combustion chamber sufficient to terminate burning of the grain above critical pressure and at which the grain would normally burn in the absence of said rate of change in pressure.

3. In a variable thrust rocket motor of the type having a combustion chamber and a solid propellant grain with burning characteristics which produce an increase in burning rate of the grain with increase in combustion chamber pressure and a corresponding increase in thrust, and an igniter for initiating combustion of the grain, the improvements, in combination, comprising;

(A) An exhaust nozzle having:
  (1) a convergent portion communicating with said combustion chamber through which a main stream of combustion chamber gases flow,
  (2) an axially aligned divergent exhaust portion, and
  (3) an effective throat disposed axially between the convergent and divergent portions, the outer wall of which is formed by an envelope of inwardly moving combustion chamber by-pass gases at substantially combustion chamber pressure adapted to mix with the main stream, the cross-sectional area of said envelope being variable, dependent upon the quantity of by-pass gases delivered thereto;
(B) means for controlling the quantity of by-pass gases delivered to said envelope and main stream, comprising an annular space of variable axial length surrounding said throat portion, forming a valve for controlling flow of the by-pass gases, said space communicating with the combustion chamber, and
(C) means for varying the axial lengths of said space and throat comprising means carried by one of said portions constructed and arranged to move it axially in response to rotation of same,
(D) the construction and arrangement being such that when the quantity of by-pass gases is increased relative to the quantity in the main stream, the envelope is constricted, reducing the effective throat area and increasing chamber pressure and thrust, and when the quantity of by-pass gases is decreased relative to the quantity in the main stream, the envelope is enlarged, increasing the effective throat area and decreasing chamber pressure and thrust.

References Cited

UNITED STATES PATENTS

| | | | |
|---|---|---|---|
| 3,073,112 | 1/1963 | Bleikamp, Jr. | 60—204 |
| 3,171,248 | 3/1965 | Ledwith | 60—204 |
| 3,266,237 | 8/1966 | Crowell, Jr. et al. | 60—204 |

FOREIGN PATENTS

| | | |
|---|---|---|
| 782,852 | 9/1957 | Great Britain. |

SAMUEL FEINBERG, Primary Examiner

U.S. Cl. X.R.

60—254